United States Patent
Iwashita et al.

(10) Patent No.: US 7,421,878 B2
(45) Date of Patent: Sep. 9, 2008

(54) CONTROL DEVICE FOR SERVO DIE CUSHION

(75) Inventors: Yasusuke Iwashita, Fujiyoshida (JP);
Tadashi Okita, Fujiyoshida (JP);
Hiroyuki Kawamura, Yamanashi (JP);
Satoshi Ikai, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 72 days.

(21) Appl. No.: 11/472,296

(22) Filed: Jun. 22, 2006

(65) Prior Publication Data

US 2006/0288755 A1   Dec. 28, 2006

(30) Foreign Application Priority Data

Jun. 24, 2005   (JP) .............................. 2005-184933

(51) Int. Cl.
*B21J 9/18* (2006.01)
(52) U.S. Cl. ..................... 72/454; 72/20.1; 72/21.4; 72/443
(58) Field of Classification Search ............... 72/20.1, 72/20.2, 21.1, 21.4, 441, 443, 454, 453.13, 72/451
See application file for complete search history.

(56) References Cited

U.S. PATENT DOCUMENTS 5,056,038 A   10/1991  Kuno et al.
5,435,166 A * 7/1995  Sunada .......................... 72/351
5,477,723 A   12/1995  Kergen
2006/0169020 A1 * 8/2006  Takayama .................. 72/405.1

FOREIGN PATENT DOCUMENTS

| EP | 0556390 A1 | 8/1993 |
|---|---|---|
| EP | 1378806 A1 * | 1/2004 |
| JP | 5-7945 | 1/1993 |
| JP | 5-131295 | 5/1993 |
| JP | 6-31499 | 2/1994 |
| JP | 7-241628 | 9/1995 |
| JP | 10-202327 | 8/1998 |
| JP | 2002-276611 | 2/2002 |
| JP | 2003-205396 | 7/2003 |

OTHER PUBLICATIONS

Japanese Notice of Reasons for Rejection mailed Oct. 30, 2007 in Japanese Application No. 2005-184933 (including a partial translation thereof).

* cited by examiner

*Primary Examiner*—Derris H. Banks
*Assistant Examiner*—Debra M Wolfe
(74) *Attorney, Agent, or Firm*—Drinker Biddle & Reath LLP

(57) ABSTRACT

A control device of a die cushion mechanism, by which a force between a slide and a die cushion may follow a commanded value even in the rapid acceleration or deceleration of the slide and, moreover, a problem such as vibration of the mechanism may be prevented in the gradual acceleration or deceleration of the slide. The control device includes a slide position detecting part, such as a position sensor, for detecting the position of the slide and a correcting part for correcting a current commanded value using an acceleration of the slide, obtained by second-order differentiation of the position of the slide detected by the position sensor.

7 Claims, 7 Drawing Sheets ated by the force gain to the commanded current value, and after the acceleration is multiplied by a constant number.

CONTROL DEVICE FOR SERVO DIE CUSHION

BACKGROUND OF THE INVENTION

1. Field of the Invention

The present invention relates to a control device for a die cushion mechanism which generates a force on a slide of a press machine using a servomotor as a driving source and, in particular, to a control device for controlling the force generated by the die cushion mechanism of the press machine.

2. Description of the Related Art

It is known that a press machine, for press working such as bending, drawing or punching, is provided with a die cushion mechanism as an attached device for applying a predetermined force or pressure, during the press working, to a movable support member (generally called a slide) supporting a first mold for press working, the force being generated by another movable member supporting a second mold. The die cushion mechanism is generally configured such that the slide (or the first mold), moving in a mold-clamping direction, directly or indirectly collides with a movable element (generally called as a cushion pad) held at a predetermined pressure and, until the molding is finished, the cushion pad is moved with the slide while applying force or pressure to the slide. During this operation, it is possible to prevent the occurrence of a wrinkle in a workpiece to be pressed by, for example, clamping an area around a site, of the workpiece, to be pressed between the cushion pad and the slide.

Many conventional die cushion mechanisms use a hydraulic or a pneumatic unit as a driving source. However, the control by the hydraulic or the pneumatic unit may be carried out only under a constant pressure. It is preferable that the pressure during drawing is varied corresponding to the amount of the drawing, however, the pressure cannot be varied in the hydraulic or the pneumatic unit.

In recent years, therefore, a die cushion mechanism using a servomotor as a driving source has been used to carry out force control with a high response, as described in Japanese Unexamined Patent Publication (Kokai) No. 10-202327. In the die cushion mechanism described in this publication, a cushion pad positioned below a slide of a press machine may be upwardly and downwardly moved by a servomotor, corresponding to the rise and fall motions of the slide. The servomotor is activated by a predetermined force command corresponding to the position of the cushion pad and adjusts the force or pressure applied, to the slide, by the cushion pad while moving the cushion pad with the slide. The collision of, and pressure between, the slide and the cushion pad may be determined by detecting a load applied to an output axis of the servomotor via the cushion pad.

In recent press working, it is desired to carry out the press working with a higher accuracy, and at a high speed, in order to improve the productivity. In order to increase a speed of the press working, it is necessary to rapidly accelerate or decelerate the slide during the press working. Also, in controlling the force of the die cushion mechanism, a necessary torque for controlling the force is obtained, as well as another torque for accelerating or decelerating the die cushion such that the motion of the die cushion may follow the motion of the slide. In driving a servomotor in the prior art, a response of the force control is constant without relation to the acceleration or the deceleration of the slide. Therefore, when the slide is gradually accelerated or decelerated, the force may be controlled so as to follow a commanded force. However, when the slide is rapidly accelerated or decelerated, the force is deviated from the commanded force. On the other hand, when a force gain is increased for the rapid acceleration or deceleration of the slide, a problem such as vibration at a low frequency may occur in the machine during the gradual acceleration or deceleration of the slide. Due to this, it is difficult to increase the force gain for rapid acceleration or deceleration.

SUMMARY OF THE INVENTION

Therefore, an object of the present invention is to provide a control device, of a die cushion mechanism, by which the force between the slide and the die cushion may follow the commanded value even in the rapid acceleration or deceleration of the slide and, moreover, a problem such as vibration of the machine may be prevented in the gradual acceleration or deceleration of the slide.

According to the present invention, there is provided a control device of a die cushion mechanism of a press machine, for generating a force applied to a slide of the press machine by using a servomotor as a driving source, the control device comprising: a force commanding part for generating a force command including a commanded force value to be generated between the slide and the die cushion mechanism; a force detecting part for detecting a force generated between the slide and the die cushion mechanism; a speed commanding part for generating a speed command including a commanded speed value of the servomotor based on the commanded force value and a force detected by the force detecting part; a speed detecting part for detecting a speed of the servomotor; a current commanding part for generating a current command including a commanded current value of the servomotor based on the commanded speed value and a speed detected by the speed detecting part; and a correcting part for correcting at least one of the commanded speed value and the commanded current value corresponding to an acceleration of the slide.

The control device may further comprise a slide position detecting part for detecting the position of the slide such that the acceleration of the slide is obtained by second-order differentiation of the position of the slide detected by the slide position detecting part. In this case, it is preferable that the correcting part corrects the commanded speed value or the commanded current value after a predetermined period of time from the collision of the slide and the die cushion mechanism.

Alternatively, the control device may further comprise a slide position commanding part for generating a position command of the slide such that the acceleration of the slide is obtained by second-order differentiation of the position command outputted by the slide position commanding part.

Concretely, the correcting part may correct the commanded current value by adding an acceleration of the slide multiplied by a constant number to the commanded current value.

Alternatively, the speed commanding part may generate the speed command by multiplying a force gain by a force deviation calculated by using a differential between the commanded force value and the detected force value, such that the correcting part corrects the commanded speed value by multiplying an acceleration of the slide by the force gain, after the acceleration is multiplied by a constant number.

Alternatively, the speed commanding part may generate the speed command by adding a product, of a first force gain and a force deviation calculated by using a differential between the commanded force value and the detected force value, to a product of a second force gain and an integration value of the force deviation, such that the correcting part corrects the commanded speed value by multiplying an acceleration of the slide by at least one of the first and second force gains, after the acceleration is multiplied by a constant number.

Alternatively, the current commanding part may generate the current command by adding a product, of a first speed gain and a speed deviation calculated by using a differential between the commanded speed value and the detected speed value, to a product of a second speed gain and an integration value of the speed deviation, such that the correcting part corrects the commanded current value by multiplying an acceleration of the slide by at least one of the first and second speed gains, after the acceleration is multiplied by a constant number.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

The present invention is explained below with reference to the drawings.

Figure 1:
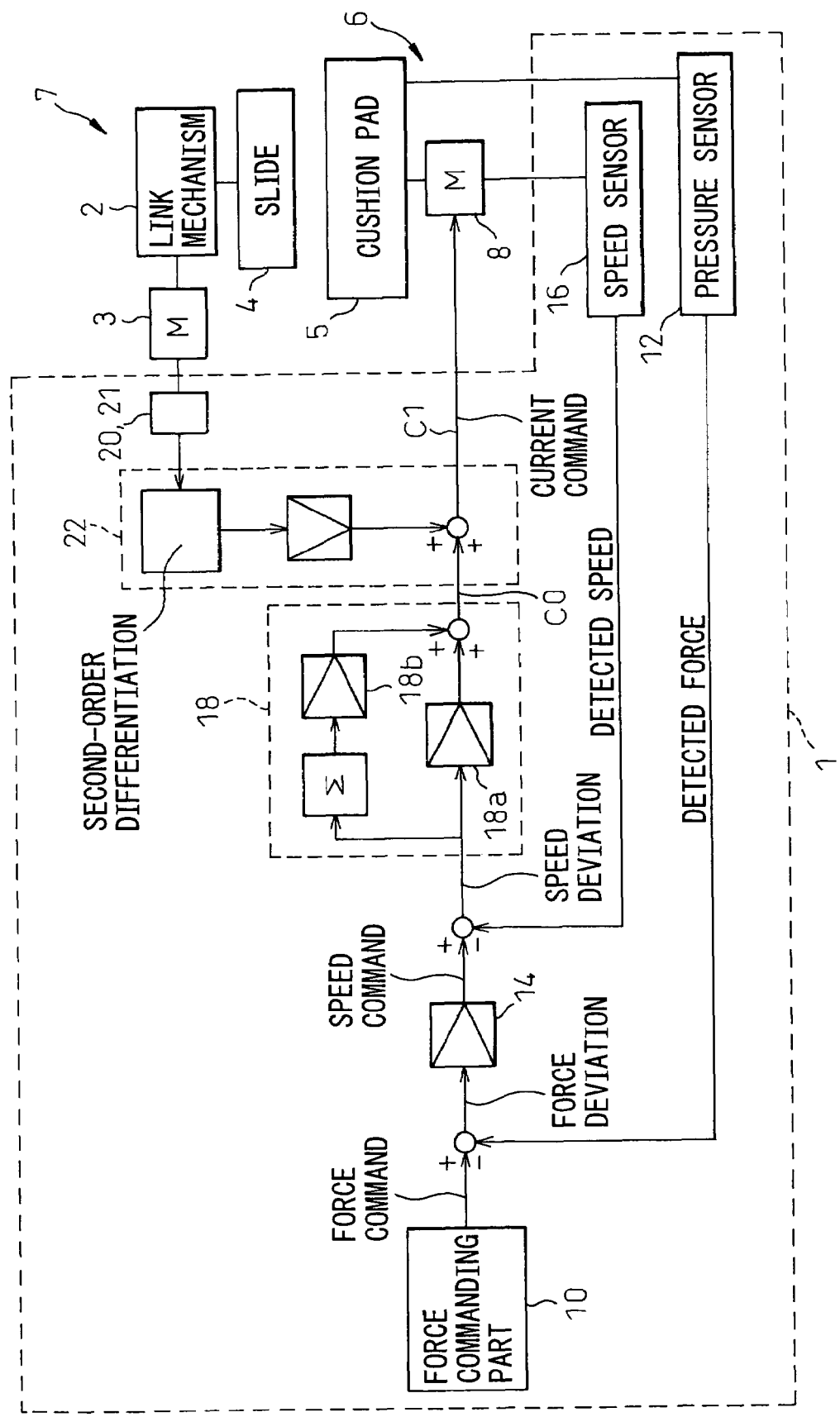
FIG. 1 is a functional block diagram of a control device according to a first embodiment of the invention.

As shown in FIG. 1, a control device 1 according to a first embodiment of the invention is used for a press machine 7 having a slide 4 driven by a servomotor 3 via a suitable link mechanism 2 and a die cushion mechanism 6 including a cushion pad 5 capable of moving corresponding to the motion of the slide 4. The control device controls a servomotor 8 for driving the cushion pad 5 so as to generate a predetermined force or pressure between the slide 4 and the cushion pad 5. As components other than the control device 1 may be the same as the conventional components, a detailed description of the components is omitted.

As shown in FIG. 1, the control device 1 of the first embodiment includes a force commanding part 10 for generating a force command including a commanded force value to be generated between the slide 4 and the die cushion mechanism 6, a force detecting part 12 such as a force sensor for detecting a force generated between the slide 4 and the die cushion mechanism 6, a speed commanding part 14 having a force gain for generating a speed command including a commanded speed value of the servomotor 8 based on the commanded force value from the force commanding part 12 and a force detected by the force sensor 12, a speed detecting part 16 such as a speed sensor for detecting a speed of the servomotor 8, a current commanding part 18 for generating a current command including a commanded current value of the servomotor 8 based on the commanded speed value from the speed commanding part 14 and a speed detected by the speed sensor 16, a slide position detecting part 20 such as a position sensor or a rotary encoder for detecting the position of the slide 4 and for calculating the acceleration of the slide 4, and a correcting part 22 for correcting the commanded current value using an acceleration of the slide obtained by second-order differentiation of the position of the slide detected by the slide position sensor 20. The current commanding part 18 may include a first speed gain or a proportional gain 18a for multiplying a speed deviation, calculated by a differential between the commanded speed value and the detected speed value, by a constant number, and a second speed gain or an integral gain 18b for multiplying an integration value of the speed deviation by a constant number.

The position detecting part 20 may be replaced with a slide position commanding part 21 for generating a position command of the slide. In this case, the correcting part 22 executes second-order differentiation of the position commanded to obtain an acceleration of the slide.

Next, the function of the correcting part 22 is explained with reference to FIGS. 1 and 2. The position sensor 20 is configured to send data including the position of the slide detected by the position sensor at a given interval (equal to "dt" in this case). On the other hand, the correcting part 22 stores the initial or previous position of the slide 4 as "p0". First, the position sensor 20 detects the slide position p1 (step S101) and sends data thereof to the correcting part 22. The correcting part 22 calculates the slide speed v1 at the current moment by using the slide positions p0 and p1 and a following equation (1), in step S102.

$$v1=(p1-p0)/dt \tag{1}$$

Then, an acceleration a1 of the slide at the current moment may be calculated by using the slide speed v1, the initial or previous slide speed v0 and a following equation (2), in step S103.

$$a1=(v1-v0)/dt \tag{2}$$

In other words, the slide acceleration may be obtained by second-order differentiation of the slide position. The position p1 and the speed v1 of the slide are then renamed to p0 and v0, respectively, for a subsequent calculation (step S104). In addition, step S104 may be moved to after step S107, as step S104 only needs to be executed before the slide position p1 is newly detected in a subsequent cycle.

Next, a correction torque T1 is calculated by using the above slide acceleration a1 and the following equation (3), in step S105.

$$T1=k1 \cdot a1 \tag{3}$$

wherein k1 is a constant number.

If according to the prior art, a current command C0 from the current commanding part 18 would be directly used for controlling the servomotor. However, in the present invention, the servomotor 8 is controlled based on a current command C1 obtained by adding the above T1 to the current command C0 (steps S106, S107). Therefore, when the slide acceleration is relatively high (i.e., in the rapid acceleration or deceleration of the slide), the servomotor 8 is controlled to generate a high torque corresponding to the slide acceleration such that the force between the slide and the die cushion may quickly follow the commanded value. Conversely, when the slide acceleration is relatively low (i.e., in the gradual acceleration or deceleration of the slide), the servomotor 8 is controlled such that vibration or the like does not occur due to the high torque of the servomotor. In this manner, the servomotor may be optimally controlled both in the rapid and gradual acceleration or deceleration, without condition resetting by the operator.

The procedure returns to step S101 after step S107 and the slide position is newly detected after the given interval "dt". When the slide position commanding part 21 is used instead of the slide position detecting part 20, the detected positions p0 and p1 of the slide is replaced with commanded positions. In other words, the commanded position p1 is read out in step S101. The other steps may be the same as those shown in FIG. 2.

Figure 2:
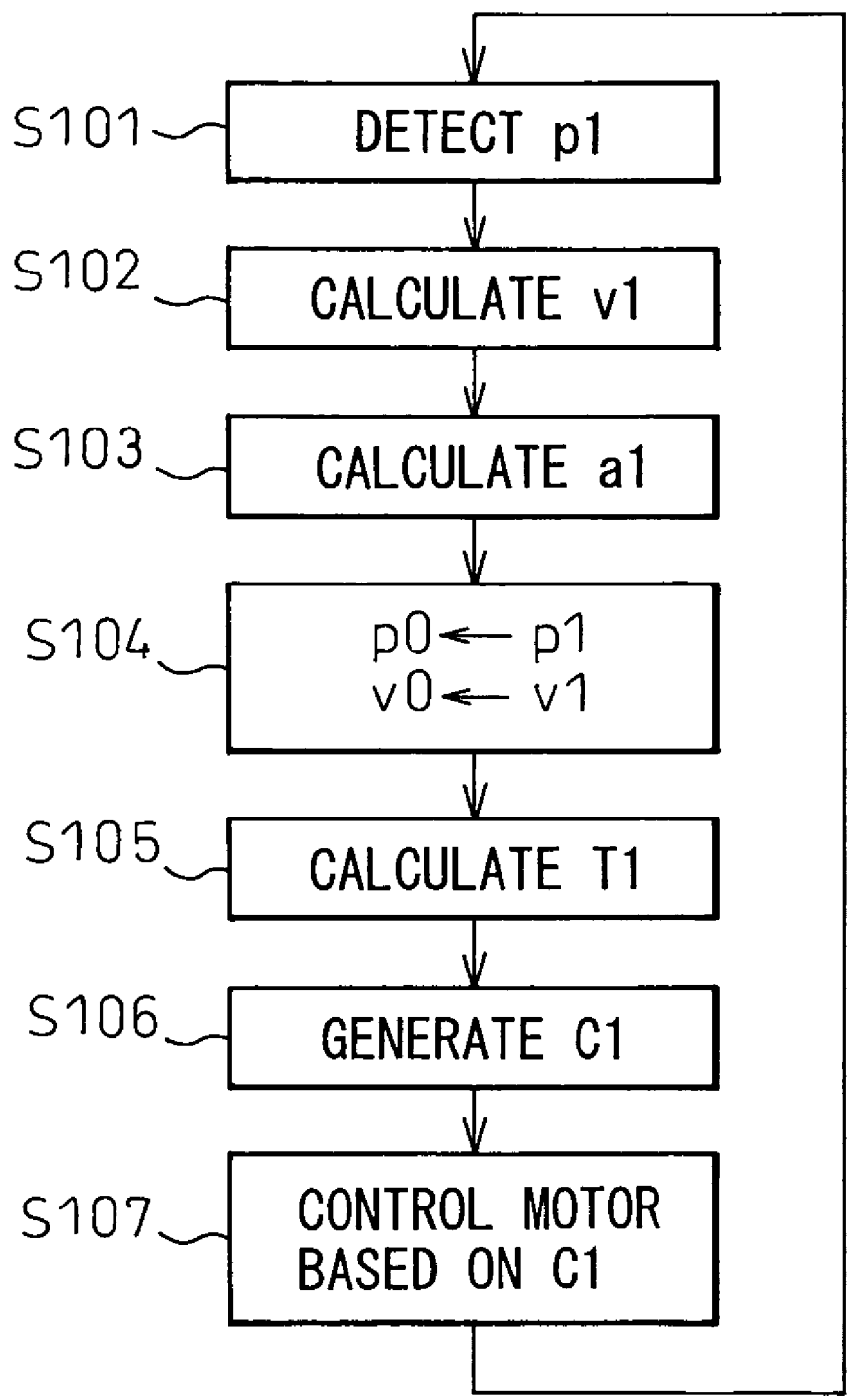
FIG. 2 is a flowchart of a function of the control device of the first embodiment.
Figure 3:
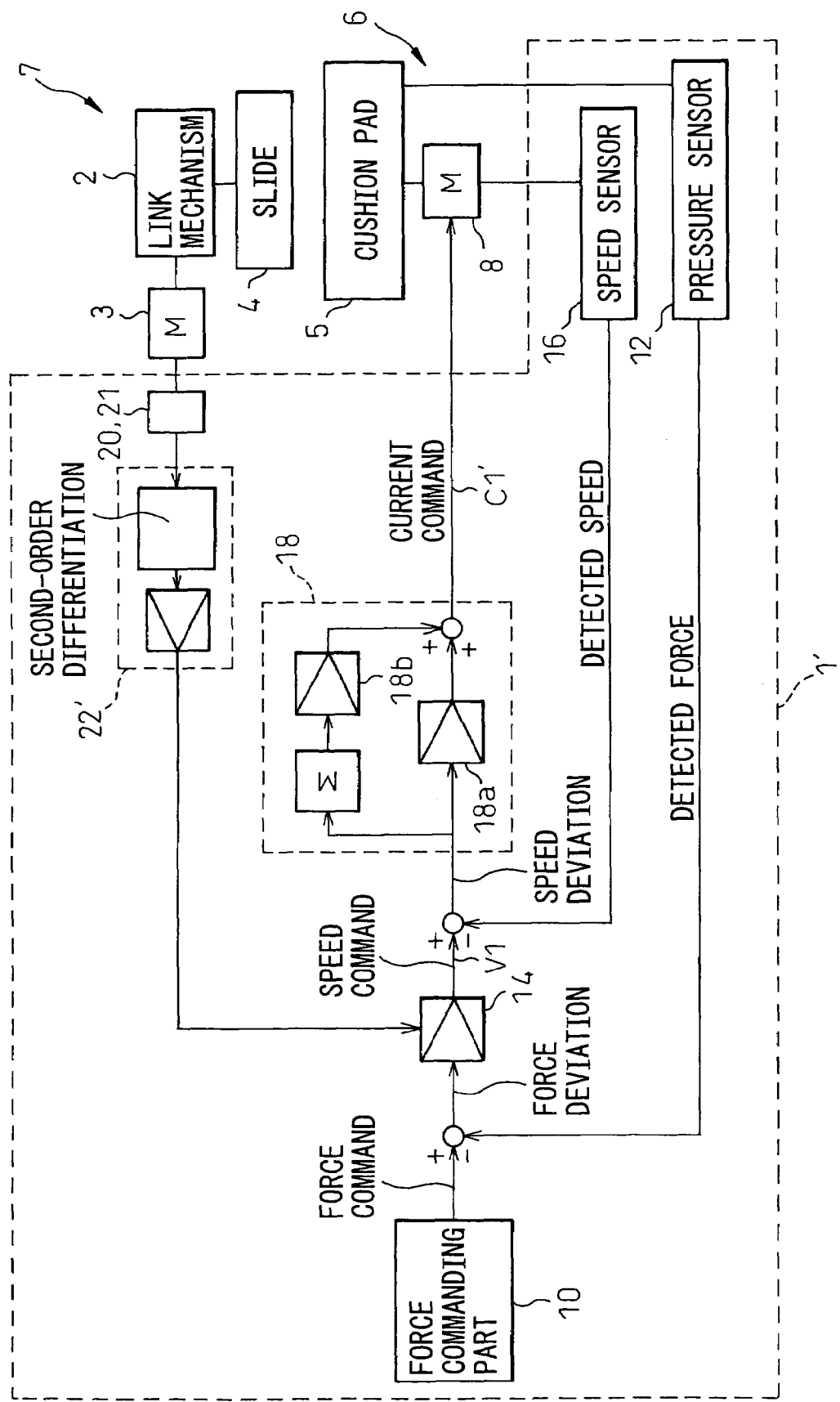
FIG. 3 is a functional block diagram of a control device according to a second embodiment of the invention.
Figure 4:
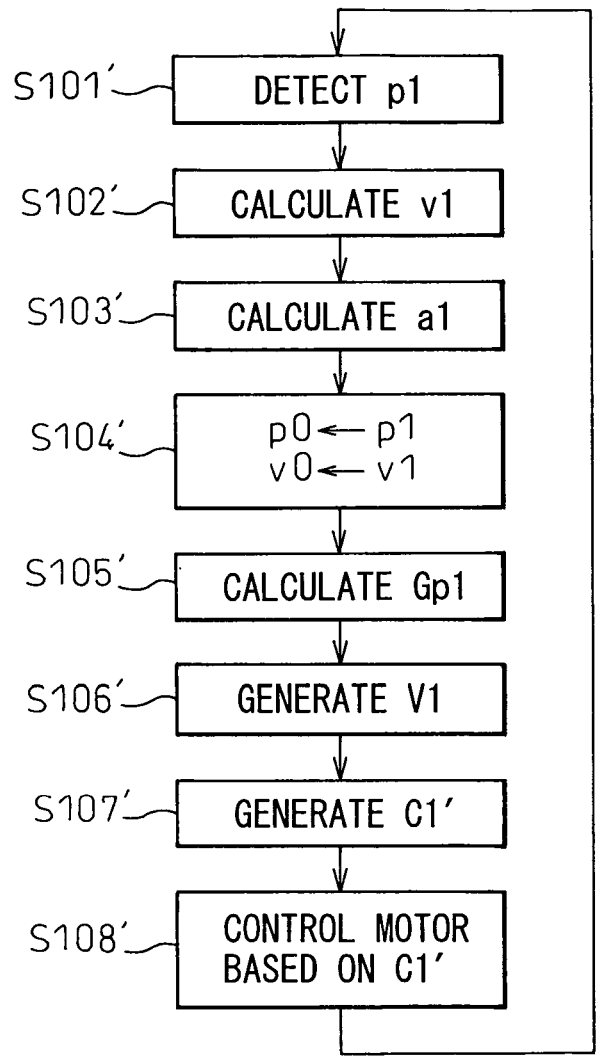
FIG. 4 is a flowchart of a function of the control device of the second embodiment.

FIG. 3 shows a control device 1' according to a second embodiment of the invention, which is similar to the control device 1 as shown in FIG. 1. Also, FIG. 4 is a flowchart, similar to FIG. 2, showing a function of the control device 1'. The second embodiment is different from the first embodiment in that a correcting part 22' of the control device 1' corrects a force gain in the speed commanding part 14, instead of correcting the commanded current value, as shown in FIG. 3. As the other function of the control device 1' may be the same as that of the control device 1, a detailed description thereof is omitted.

As described above, in the second embodiment, the correcting part 22' corrects the force gain. In other words, steps S101' to S104' of FIG. 4 are the same as steps S101 to S104 of FIG. 2. However, in step S105', a force gain Gp1 is calculated by using the above slide acceleration a1 and the following equation (4), instead of calculating the correction torque.

$$Gp1 = k2 \cdot Gp0 \cdot a1 \quad (4)$$

wherein k2 is a constant number and Gp0 is an initial force gain.

According to the prior art, in the speed commanding part 14, the speed command could be generated by multiplying a force gain Gp0 by a force deviation calculated by a differential between the commanded force value and the detected force value. However, in the present invention, a speed command V1 is generated and corrected by using a force gain Gp1 which can be varied corresponding to the acceleration of the slide (step S106'). Further, a current command C1' is generated and corrected based on the speed command V1 (step S107'). Therefore, the servomotor 8 may also be optimally controlled by the current command C1' (step S108'). Thereafter, the procedure, for generating the speed command V1 based on the gain Gp1 and generating the current command based on the speed command V1, may be the same as the prior art. However, as the force gain is suitably changed in the present invention, the speed command calculated by the force gain and the current command based on the speed command are also suitably changed.

Figure 5:
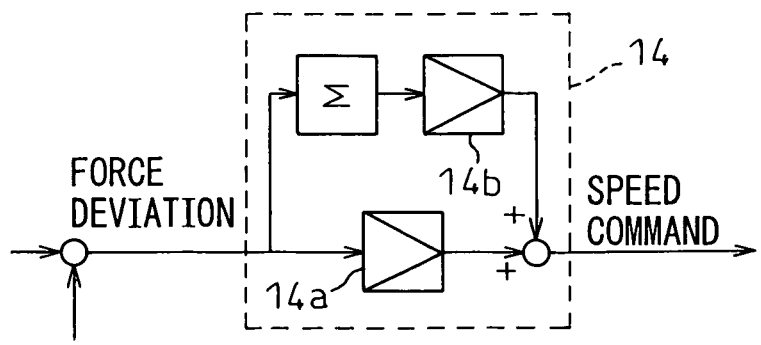
FIG. 5 is a diagram showing a modification of a speed commanding means of the control device of the second embodiment.

As a modification of the second embodiment, as partly shown in FIG. 5, the current commanding part 14 may have a first force gain or a proportional gain 14a for multiplying a force deviation by a constant number, and a second force gain or an integral gain 14b for multiplying an integration value of the force deviation by a constant number. In this case, the correcting part 22' may correct one of the first and second force gains 14a and 14b or both of the force gains.

Figure 6:
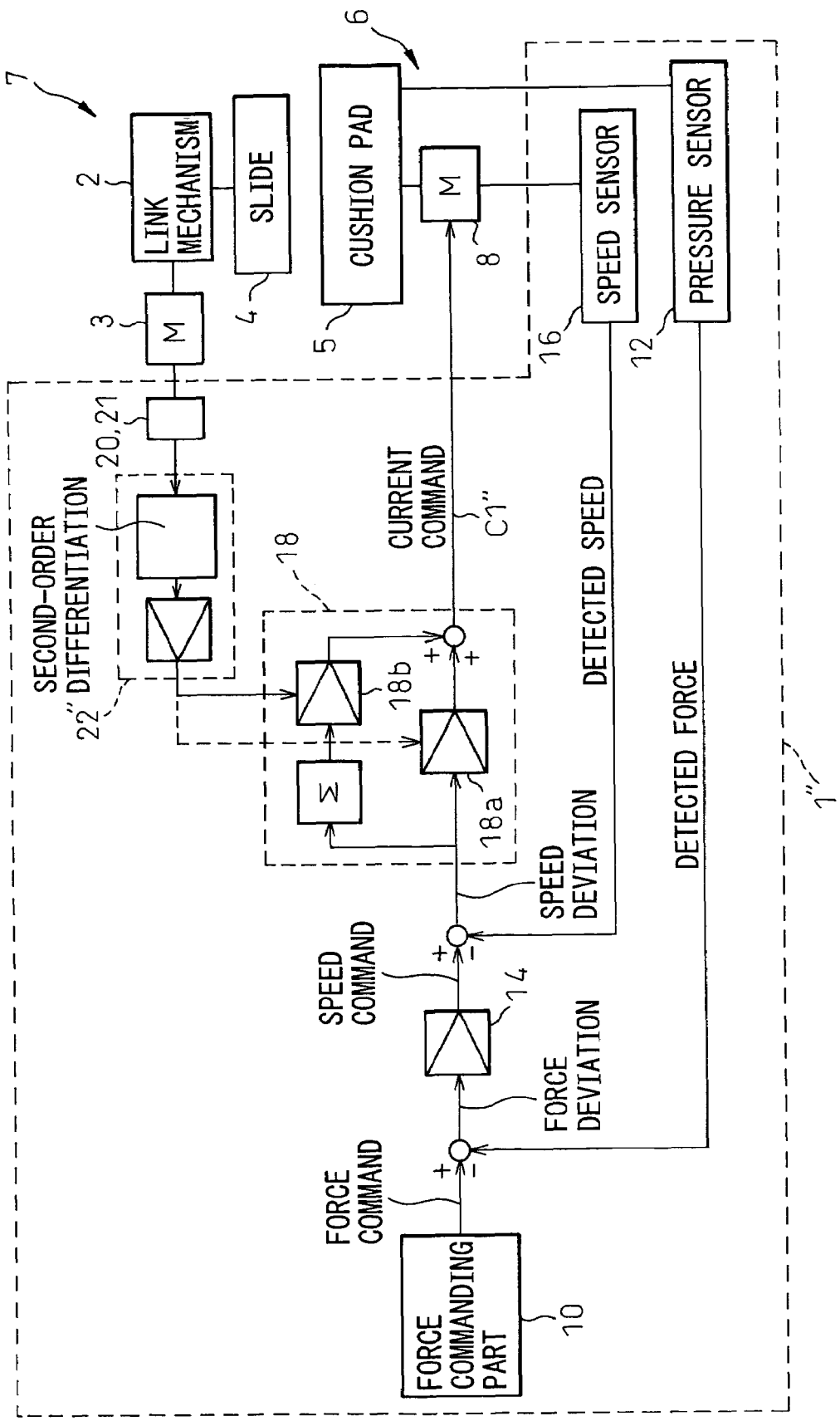
FIG. 6 is a functional block diagram of a control device of a third embodiment according to the invention.
Figure 7:
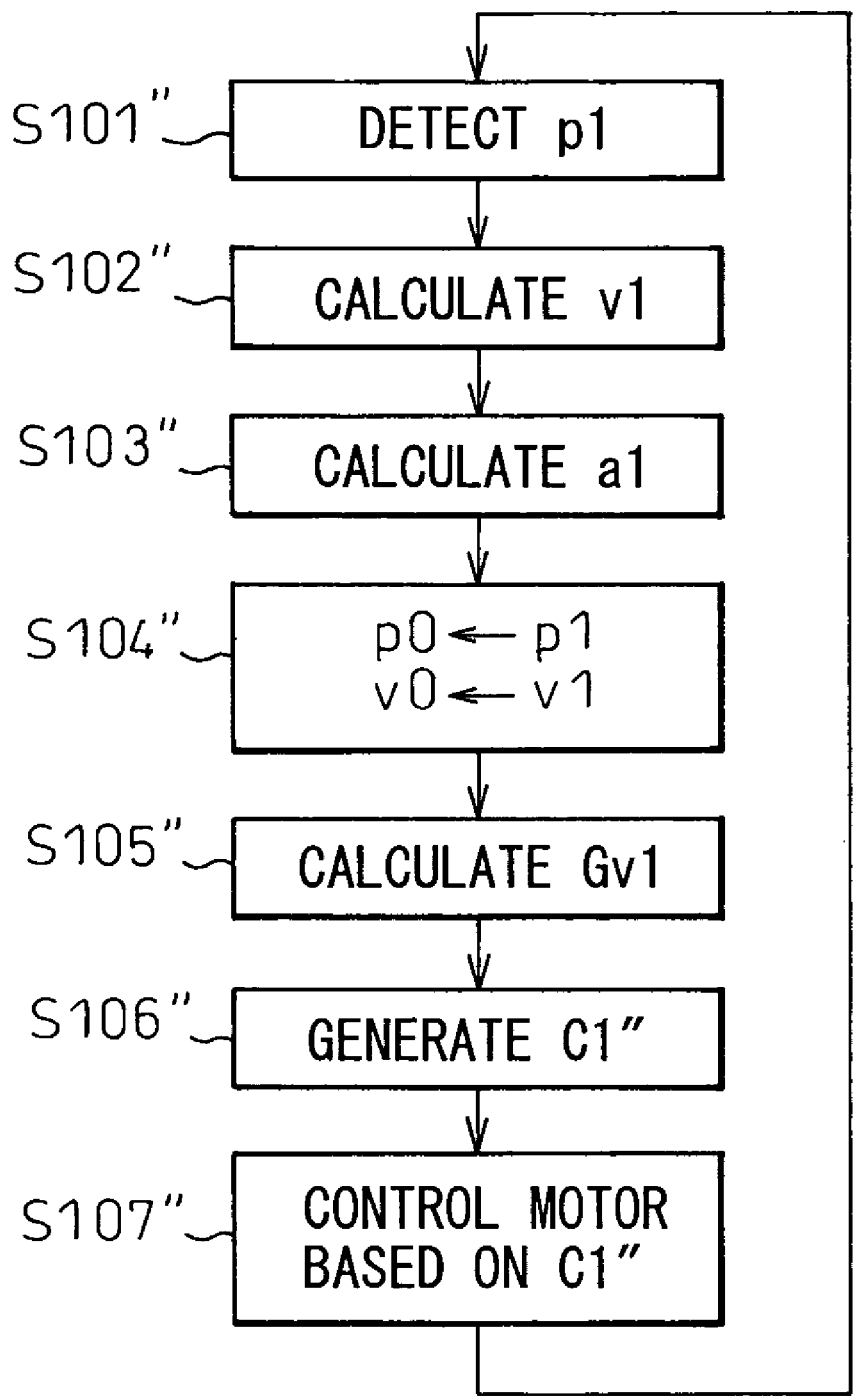
FIG. 7 is a flowchart of a function of the control device of the third embodiment.

FIG. 6 shows a control device 1'' according to a third embodiment of the invention, which is similar to the control devices 1 and 1' as shown in FIGS. 1 and 3. Also, FIG. 7 is a flowchart, similar to FIGS. 2 and 4, showing a function of the control device 1''. The third embodiment is different from the other embodiments in that a correcting part 22'' of the control device 1'' corrects a speed gain in the current commanding part 18. As the other function of the control device 1'' may be the same as that of the control device 1 or 1', the detailed description thereof is omitted below.

As shown in FIG. 7, in the third embodiment, the correcting part 22'' corrects the speed gain. In other words, steps S101'' to S104'' of FIG. 7 are the same as steps S101 to S104 of FIG. 2. However, in step S105'', a speed gain Gv1 is calculated by using the above slide acceleration a1 and a following equation (5).

$$Gv1 = k3 \cdot Gv0 \cdot a1 \quad (5)$$

wherein k3 is a constant number and Gv0 is an initial speed gain.

According to the prior art, in the current commanding part 18, the current command could be generated by multiplying the speed gain Gv0 by a speed deviation calculated by a differential between the commanded speed value and the detected speed value. However, in the present invention, a current command C1'' is generated and corrected by using a speed gain Gv1 which can be varied corresponding to the acceleration of the slide (step S106''). Therefore, the servomotor 8 may also be optimally controlled by the current command C1'' (step S107'').

Also, in the third embodiment, the correcting part 22'' may correct one of the first and second speed gains 18a and 18b or both of the speed gains.

In either of the above embodiments, either the detected position or the commanded position of the slide may be used as data representing the slide position in order to calculate the slide acceleration. However, when the detected slide position is used, an inappropriate detected value may be obtained because the slide position cannot be stably detected due to an impact caused by the collision of the slide and the die cushion. In this case, therefore, it is preferable that the correcting part does not function until a predetermined period of time passes (or until the detected value becomes stable).

Figure 8:
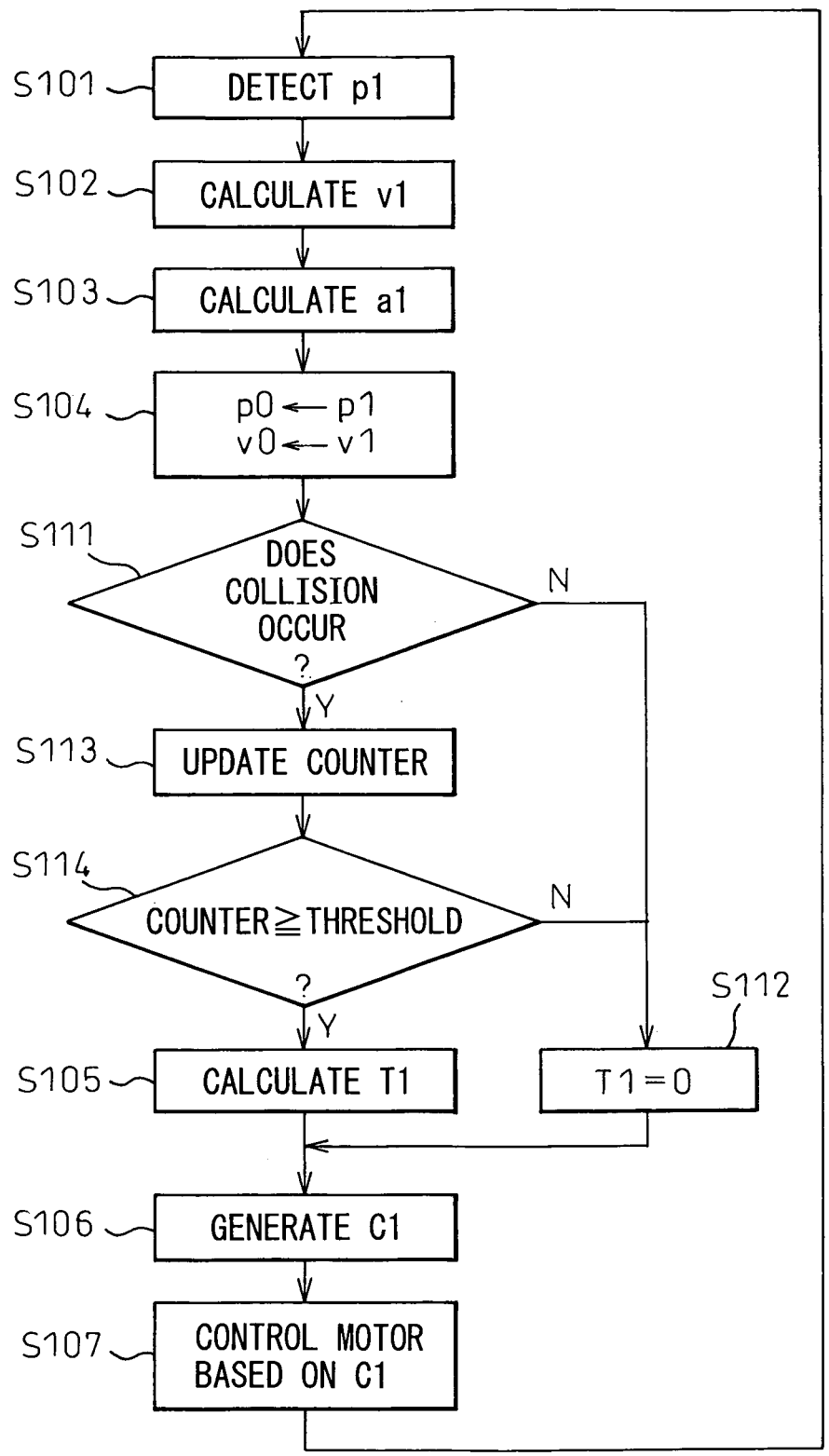
FIG. 8 is a flowchart showing a preferred modification of the flowchart as shown in FIG. 2.

FIG. 8 shows a modification of the flowchart of FIG. 2, for explaining a procedure in which the correcting part does not function until a predetermined period time passes after the impact between the slide and the die cushion.

Concretely, step S111 after step S104 judges whether the slide has come into collision with the die cushion. Before the collision, the correction is not necessary as the pressure is not applied to the die cushion. Therefore, a correcting torque T1 is set to zero in step S112. On the other hand, after the collision, a suitable counter is updated in step S113 and it is judged that the updated counter has reached a predetermined threshold in step S114. If the counter is smaller than the threshold, the procedure progresses to step S112. Otherwise, the correcting torque T1 is calculated in step S115. According to the control device capable of performing the correction based on the flowchart of FIG. 8, as the correction by the correcting part is not carried out until the predetermined period of time passes after the collision, an unnecessary or inaccurate correction may be prevented.

In the embodiments of the invention, the acceleration of the slide is calculated by second-order differentiation of the detected position or the commanded position of the slide. Alternatively, the acceleration may be calculated by first-order differentiation of a slide speed detected by a speed sensor or a commanded speed of the slide. Needless to say, a slide acceleration value itself detected by an acceleration sensor may also be used. The gain correction value or the current (torque) correction value calculated by the correcting part is explained as a value proportional to the slide acceleration, however, the correction value may be proportional to a square or a square root of the slide acceleration, depending on the configuration of the die cushion mechanism.

In the prior art, as the response of the force control is constant, the actual force cannot substantially follow the commanded force. On the contrary, according to the control device of the die cushion mechanism of the present invention, the torque command to allow the die cushion to follow the slide may be corrected corresponding to the acceleration or the deceleration of the slide, whereby the response of the force control may be suitably changed such that the actual force substantially follows the commanded force.

In addition, when the slide acceleration is calculated by the detected position of the slide, by correcting the commanded current value after a predetermined period of time from the collision of the slide and the die cushion mechanism, an unstable detected position value of the slide, immediately after the collision, is not used for controlling the die cushion.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A control device of a die cushion mechanism of a press machine, for generating a force applied to a slide of the press machine by using a servomotor as a driving source, the control device comprising: a force commanding part for generating a force command including a commanded force value to be generated between the slide and the die cushion mechanism;
    a force detecting part for detecting a force generated between the slide and the die cushion mechanism;
    a speed commanding part for generating a speed command including a commanded speed value of the servomotor based on the commanded force value and a force detected by the force detecting part;
    a speed detecting part for detecting a speed of the servomotor;
    a current commanding part for generating a current command including a commanded current value of the servomotor based on the commanded speed value and a speed detected by the speed detecting part; and
    a correcting part for correcting at least one of the commanded speed value and the commanded current value corresponding to an acceleration of the slide, wherein the control device further comprises a slide position detecting part for detecting the position of the slide such that the acceleration of the slide is obtained by second-order differentiation of the position of the slide detected by the slide position detecting part.

2. The control device as set forth in claim 1, wherein the correcting part corrects the commanded speed value or the commanded current value after a predetermined period of time from the collision of the slide and the die cushion mechanism.

3. A control device of a die cushion mechanism of a press machine, for generating a force applied to a slide of the press machine by using a servomotor as a driving source, the control device comprising: a force commanding part for generating a force command including a commanded force value to be generated between the slide and the die cushion mechanism;
    a force detecting part for detecting a force generated between the slide and the die cushion mechanism;
    a speed commanding part for generating a speed command including a commanded speed value of the servomotor based on the commanded force value and a force detected by the force detecting part;
    a speed detecting part for detecting a speed of the servomotor;
    a current commanding part for generating a current command including a commanded current value of the servomotor based on the commanded speed value and a speed detected by the speed detecting part; and
    a correcting part for correcting at least one of the commanded speed value and the commanded current value corresponding to an acceleration of the slide, wherein the control device further comprises a slide position commanding part for generating a position command of the slide such that the acceleration of the slide is obtained by second-order differentiation of the position command outputted by the slide position commanding part.

4. A control device of a die cushion mechanism of a press machine, for generating a force applied to a slide of the press machine by using a servomotor as a driving source, the control device comprising: a force commanding part for generating a force command including a commanded force value to be generated between the slide and the die cushion mechanism;
    a force detecting part for detecting a force generated between the slide and the die cushion mechanism;
    a speed commanding part for generating a speed command including a commanded speed value of the servomotor based on the commanded force value and a force detected by the force detecting part;
    a speed detecting part for detecting a speed of the servomotor;
    a current commanding part for generating a current command including a commanded current value of the servomotor based on the commanded speed value and a speed detected by the speed detecting part; and
    a correcting part for correcting at least one of the commanded speed value and the commanded current value corresponding to an acceleration of the slide, wherein the correcting part corrects the commanded current value by adding an acceleration of the slide multiplied by a constant number to the commanded current value.

5. A control device of a die cushion mechanism of a press machine, for generating a force applied to a slide of the press machine by using a servomotor as a driving source, the control device comprising: a force commanding part for generating a force command including a commanded force value to be generated between the slide and the die cushion mechanism;
    a force detecting part for detecting a force generated between the slide and the die cushion mechanism;
    a speed commanding part for generating a speed command including a commanded speed value of the servomotor based on the commanded force value and a force detected by the force detecting part;
    a speed detecting part for detecting a speed of the servomotor;
    a current commanding part for generating a current command including a commanded current value of the servomotor based on the commanded speed value and a speed detected by the speed detecting part; and
    a correcting part for correcting at least one of the commanded speed value and the commanded current value corresponding to an acceleration of the slide, wherein the speed commanding part generates the speed command by multiplying a force gain by a force deviation calculated by using a differential between the commanded force value and the detected force value, such that the correcting part corrects the commanded speed value by multiplying an acceleration of the slide by the force gain, after the acceleration is multiplied by a constant number.

6. A control device of a die cushion mechanism of a press machine, for generating a force applied to a slide of the press machine by using a servomotor as a driving source, the control device comprising: a force commanding part for generating a force command including a commanded force value to be generated between the slide and the die cushion mechanism;

a force detecting part for detecting a force generated between the slide and the die cushion mechanism;

a speed commanding part for generating a speed command including a commanded speed value of the servomotor based on the commanded force value and a force detected by the force detecting part;

a speed detecting part for detecting a speed of the servomotor;

a current commanding part for generating a current command including a commanded current value of the servomotor based on the commanded speed value and a speed detected by the speed detecting part; and a correcting part for correcting at least one of the commanded speed value and the commanded current value corresponding to an acceleration of the slide, wherein the speed commanding part generates the speed command by adding a product, of a first force gain and a force deviation calculated by using a differential between the commanded force value and the detected force value, to a product of a second force gain and an integration value of the force deviation, such that the correcting part corrects the commanded speed value by multiplying an acceleration of the slide by at least one of the first and second force gains, after the acceleration is multiplied by a constant number.

7. A control device of a die cushion mechanism of a press machine, for generating a force applied to a slide of the press machine by using a servomotor as a driving source, the control device comprising: a force commanding part for generating a force command including a commanded force value to be generated between the slide and the die cushion mechanism;

a force detecting part for detecting a force generated between the slide and the die cushion mechanism;

a speed commanding part for generating a speed command including a commanded speed value of the servomotor based on the commanded force value and a force detected by the force detecting part;

a speed detecting part for detecting a speed of the servomotor;

a current commanding part for generating a current command including a commanded current value of the servomotor based on the commanded speed value and a speed detected by the speed detecting part; and a correcting part for correcting at least one of the commanded speed value and the commanded current value corresponding to an acceleration of the slide, wherein the current commanding part generates the current command by adding a product, of a first speed gain and a speed deviation calculated by using a differential between the commanded speed value and the detected speed value, to a product of a second speed gain and an integration value of the speed deviation, such that the correcting part corrects the commanded current value by multiplying an acceleration of the slide by at least one of the first and second speed gains, after the acceleration is multiplied by a constant number.

* * * * *